(12) United States Patent
Zhang

(10) Patent No.: US 11,014,335 B2
(45) Date of Patent: May 25, 2021

(54) FOUR-LAYER STRUCTURE SCREEN PROTECTIVE FILM AND MANUFACTURING PROCESS THEREOF

(71) Applicant: Shenzhen Huaxinlong Paper Products Packing Co., Ltd., Shenzhen (CN)

(72) Inventor: Biao Zhang, Shenzhen (CN)

(73) Assignee: SHENZHEN HUAXINLONG PAPER PRODUCTS PACKING CO., LTD., Shenzhen (CN)

( * ) Notice: Subject to any disclaimer, the term of this patent is extended or adjusted under 35 U.S.C. 154(b) by 109 days.

(21) Appl. No.: 16/426,197

(22) Filed: May 30, 2019

(65) Prior Publication Data
US 2020/0338855 A1    Oct. 29, 2020

(30) Foreign Application Priority Data

Apr. 23, 2019   (CN) .......................... 201910327789.4

(51) Int. Cl.
| | |
|---|---|
| *B32B 9/04* | (2006.01) |
| *B32B 7/06* | (2019.01) |
| *B32B 3/28* | (2006.01) |
| *C09J 7/40* | (2018.01) |
| *B32B 38/00* | (2006.01) |
| *B32B 38/14* | (2006.01) |

(52) U.S. Cl.
CPC ................ *B32B 9/045* (2013.01); *B32B 3/28* (2013.01); *B32B 7/06* (2013.01); *B32B 38/0004* (2013.01); *B32B 38/14* (2013.01); B32B 2250/04 (2013.01); B32B 2307/584 (2013.01); C09J 7/40 (2018.01); C09J 7/403 (2018.01); Y10T 428/149 (2015.01); Y10T 428/1476 (2015.01)

(58) Field of Classification Search
CPC ..... B32B 9/045; B32B 38/0004; B32B 38/10; B32B 38/145; B32B 38/14; B32B 3/28; B32B 33/00; B32B 7/06; B32B 2037/268; B32B 2037/584; B32B 2250/04; C09J 7/403; C09J 7/40; Y10T 428/149; Y10T 428/1476

See application file for complete search history.

(56) References Cited

U.S. PATENT DOCUMENTS

| | | | | |
|---|---|---|---|---|
| 5,942,332 A | * | 8/1999 | Nakamura | ................ B32B 7/06 428/447 |
| 2015/0370406 A1 | * | 12/2015 | Zhao | ..................... G06F 3/0488 345/174 |

* cited by examiner

*Primary Examiner* — Patricia L. Nordmeyer
(74) *Attorney, Agent, or Firm* — Anova Law Group, PLLC

(57) ABSTRACT

Provides a four-layer structure screen protective film and a manufacturing process thereof, comprising films arranged in sequence, from bottom up: bottom layer release film, single-sided silica gel segmented composite release film, single-sided silica gel hardened practical film, and top layer protective film; composite release film has break lines arranged along length direction, which segment composite release film into pieces; low-viscosity silica gel layer is fixedly arranged on lower surface, whose lower surface is bonded to upper surface of bottom layer release film; lower surface of single-sided silica gel hardened practical film has silica gel layer fixedly arranged, whose lower surface is bonded to composite release film. Being able to move on screen repeatedly during film-adjusting process, avoiding large area of silica gel exposing after whole face of release film is peeled off, thus avoiding from sucking dusts or cilia in air.

9 Claims, 5 Drawing Sheets

FOUR-LAYER STRUCTURE SCREEN PROTECTIVE FILM AND MANUFACTURING PROCESS THEREOF

CROSS-REFERENCES TO RELATED APPLICATIONS

This application claims priority to Chinese Patent Application No. 201910327789.4, filed on 23 Apr. 2019, the content of all of which is incorporated herein by reference.

TECHNICAL FIELD

The present invention generally relates to the field of a screen protective film, and more particularly, relates to a four-layer structure screen protective film and a manufacturing process thereof.

BACKGROUND

A screen protective film is a most common screen protector on market, while in a plurality of protective films, a PET protective film is widely used, which owns a character of a relatively hard texture, and a relatively good scratch resistance, as well as not showing yellow or being oily, even after a long time usage, which is different to a PVC material. However, usually the PET protective film is pasted and stuck by a silica gel, and a price for the PET protective film is much higher than that of a PVC protective film. A plurality of famous brand cell phones abroad have a PET protective film in package when leaving factory. And the PET protective film owns a finer process and package, while a plurality of manufactures have specially ordered the PET protective films for their popular cell phones, which may be applied directly without any cuttings.

A screen protective film currently on market has two problems causing hard to stick well during a film sticking process: first, it is hard to be aligned accurately at one time, instead, it needs a plurality of adjustments, and during a position adjusting process, a finger is easy to harm a glue surface of the screen protective film. Secondly, after uncovering the release film, a large area of silica gel will be exposed, and that is easy to suck dust or cilium in air. Both points listed above are a main reason causing a failure to stick a film.

All above, during pasting and sticking, a screen protective film in the prior art has a plurality of problems including: hard to be aligned accurately at a time, a plurality of adjustments required, uncovering and aligning repeatedly during an adjustment process, and it is needed to totally peel off all the release film, causing a big area of silica gel exposing, which is easy to suck dust or cilium in air.

Therefore, the existing technology needs to be improved and developed.

BRIEF SUMMARY OF THE INVENTION

According to a plurality of defects listed above in the prior art, the objective of the present invention is to provide a four-layer structure screen protective film and a manufacturing process thereof, which owns a plurality of technical advances including: being able to be adjusted repeatedly during an adjustment process when sticking a film, avoiding a large area of silica gel exposing after a release film is peeled off as in a traditional film sticking process, thus avoiding from sucking dusts or cilia in the air.

In order to achieve an object described above, the technical solution of the present invention is as follows:

A four-layer structure screen protective film, comprising a plurality of films arranged in a sequence, from bottom up: a bottom layer release film, a single-sided silica gel segmented composite release film, a single-sided silica gel hardened practical film, and a top layer protective film;

the single-sided silica gel segmented composite release film has a plurality of break lines arranged along a length direction, the plurality of break lines segment the single-sided silica gel segmented composite release film into a plurality of pieces;

a lower surface of the single-sided silica gel segmented composite release film has a low-viscosity silica gel layer fixedly arranged, while a lower surface of the low-viscosity silica gel layer is bonded to an upper surface of the bottom layer release film;

a lower surface of the single-sided silica gel hardened practical film has a silica gel layer fixedly arranged, while a lower surface of the silica gel layer is bonded to the single-sided silica gel segmented composite release film.

Further, the break lines has been arranged as one, one of the one break lines segments the single-sided silica gel segmented composite release film into a first segmented composite release film and a second segmented composite release film.

Further, a front end of the bottom layer release film has a first hand-tearing label arranged, an end of the first segmented composite release film near the break line has a second hand-tearing label arranged, an end of the second segmented composite release film near the break line has a third hand-tearing label arranged, and a rear end of the top layer protective film has a fourth hand-tearing label arranged.

Further, the first hand-tearing label, the second hand-tearing label, the third hand-tearing label and the fourth hand-tearing label are on a same side of the four-layer structure screen protective film.

Further, a middle area on each end of the bottom layer release film, the single-sided silica gel segmented composite release film, the single-sided silica gel hardened practical film and the top layer protective film has a button hole arranged.

Further, between the single-sided silica gel hardened practical film and the top layer protective film, there is a sticking layer arranged, the sticking layer is applied to bonding an upper surface of the single-sided silica gel hardened practical film to a lower surface of the top layer protective film.

A manufacturing process for a four-layer structure screen protective film, wherein, comprising a plurality of following steps:

printing a content desired on a first release film;

obtaining a second release film with acrylic adhesive coated on an upper surface thereof, a bottom layer release film located on a lower surface of the second release film, and a PE textured film composited with a lower surface of the bottom layer release film;

bonding a surface coated with the acrylic adhesive of the second release film to a printing surface of the first release film, before forming a bonding material;

die cutting the bonding material, penetrating the first release film and the second release film, without penetrating the bottom layer release film and the PE textured film;

cutting a plurality of break lines in the first release film and the second release film, before obtaining a single-sided silica gel segmented composite release film;

obtaining a single-sided silica gel hardened practical film with a silica gel surface exposed, and a top layer protective film on an upper surface of the single-sided silica gel hardened practical film;

bonding the silica gel surface of the single-sided silica gel hardened practical film to the first release film;

slicing the bonding material in a die-cutting machine before rendering a size and shape desired, as well as a shape of a hand-tearing label, without penetrating the PE textured film on a bottom layer during a die-cutting process;

peeling off a sheet-like finished product from the PE textured film.

Further, printing the content desired on the first release film comprises a plurality of steps specifically:

preparing a first roll material in advance, the first roll material comprises the first release film on bottom and a first PET protective film bonded on the first release film;

printing a plurality of contents desired on the first release film through a printing machine.

Further, obtaining the second release film with acrylic adhesive coated on the upper surface thereof, the bottom layer release film located on the lower surface of the second release film, and the PE textured film composited with the lower surface of the bottom layer release film, comprises a plurality of steps specifically:

preparing a second roll material in advance, the second roll material comprises, from upper down, arranged in a sequence, a second upper layer release film, the second release film with acrylic adhesive coated on an upper surface and low-viscosity silica gel fixed on a lower surface, the bottom layer release film, and the PE textured film on a lower surface of the bottom layer release film;

uncovering the second upper layer release film, and exposing an acrylic adhesive surface of the second release film having the acrylic adhesive coated.

Further, obtaining the single-sided silica gel hardened practical film exposed on a silica gel surface, and the top layer protective film on the upper surface of the single-sided silica gel hardened practical film, comprises a plurality of steps specifically:

preparing a third roll material in advance, the third roll material comprises, from upper down, arranged in a sequence, the top layer protective film, the single-sided silica gel hardened practical film and a third lower layer release film;

uncovering the third lower layer release film of the third roll material, before obtaining the single-sided silica gel hardened practical film and exposing the silica gel surface thereof.

Compared with the prior art, by adopting a solution above, the present invention owns a plurality of benefits: the present solution adopts a single-sided silica gel segmented composite release film, uncovers a whole face of release film under a segmented release film by the first hand-tearing label before applying the film, and exposes a whole surface of low-viscosity silica gel, aligning on a screen repeatedly, thereby avoiding, during a process of correcting positions, the silica gel in the single-sided silica gel hardened practical film from exposing and sucking dusts and cilia in the air; the low-viscosity silica gel layer is suitable for a plurality of times open and close, while a film sticking process is accurate, and when reopening the single-sided silica gel segmented composite release film, the screen is cleaned for a second time by the low-viscosity silica gel layer thereon. Since there is a break line in a middle of the single-sided silica gel segmented composite release film, after the single-sided silica gel segmented composite release film is reopened, the second hand-tearing label on a side peels off the composite release film under a usage layer before releasing it down again, while another half single-sided silica gel segmented composite release film is still sticking on the surface of the screen, thus reopening half single-sided silica gel segmented composite release film and releasing it down will not change a position thereof, keeping the silica gel layer sticking on the surface of the screen. After turning the machine around, another half single-sided silica gel segmented composite release film is peeled off by the third hand-tearing label, and the four-layer structure screen protective film is released down again, making the single-sided silica gel hardened practical film and the silica gel layer stick to the screen. In a whole process, the silica gel layer is exposed in the air with a short time and a small area, thus it has greatly improved a success rate of film sticking.

Wherein, 10. bottom layer release film; 20. single-sided silica gel segmented composite release film; 21. first segmented composite release film; 22. second segmented composite release film; 23. break line; 30. single-sided silica gel hardened practical film; 40. top layer protective film; 51. first hand-tearing label; 52. second hand-tearing label; 53. third hand-tearing label; 54. fourth hand-tearing label; 60. button hole; 70. low-viscosity silica gel layer; 80. silica gel layer; 91. first PET protective film; 92. first release film; 93. second upper layer release film; 94. second release film; 96. PE textured film; 97. third lower release film.

DETAILED DESCRIPTION

The present invention provides a four-layer structure screen protective film and a manufacturing process thereof. To make the objectives, technical schemes and results more explicit, further description will be made in detail to illustrate the present invention. It should be understood that the specific embodiments described herein are only used to explain the present invention, and are not intended to limit the scope of the present invention.

Figure 1:
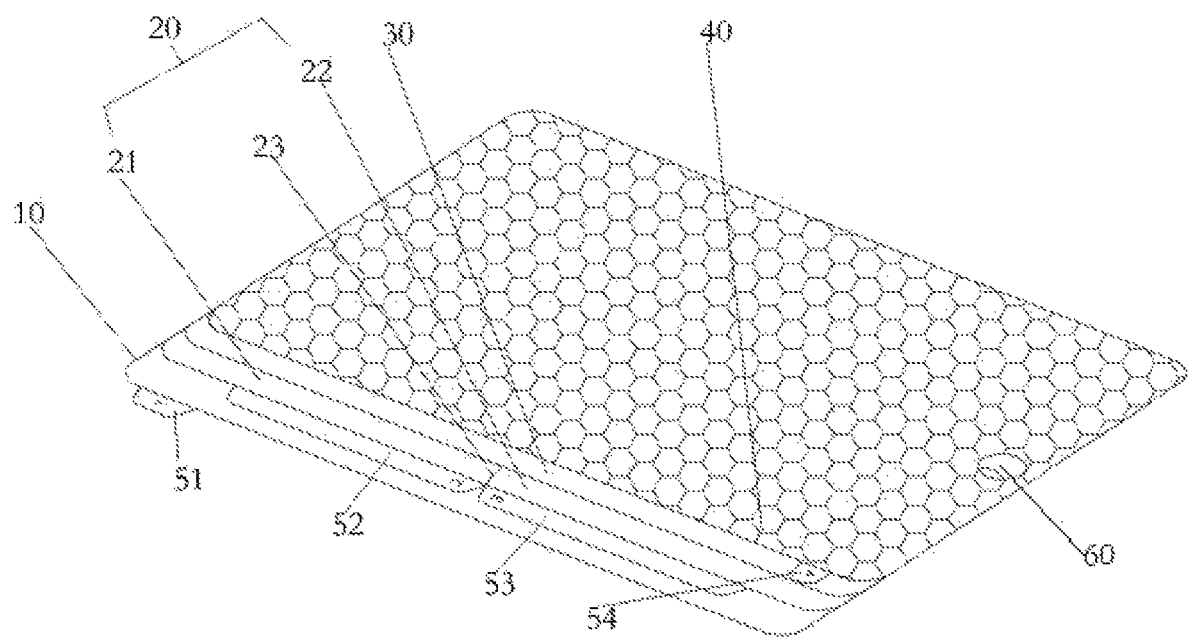
FIG. 1 illustrates a structural schematic diagram on an embodiment of the four-layer structure screen protective film provided by the present disclosure.

Shown as FIG. 1, a four-layer structure screen protective film comprises a plurality of films arranged in a sequence, from bottom up: a bottom layer release film 10, a single-sided silica gel segmented composite release film 20, a single-sided silica gel hardened practical film 30, and a top layer protective film 40. In order to improve a product quality, in the present embodiment, the bottom layer release film 10, the single-sided silica gel segmented composite release film 20, the single-sided silica gel hardened practical film 30, and the top layer protective film 40 are all adopting a PET transparent film, wherein, a thickness of the bottom layer release film 10 is 0.05 mm, the bottom layer release film 10 with such a thickness has a certain structural strength, being able to protect a plurality of other release films inside the four-layer structure screen protective film; a thickness of the single-sided silica gel segmented composite release film 20 is 0.135 mm±0.05 mm, the single-sided silica gel segmented composite release film 20 adopting such a thickness has a toughness during pasting, thus easy to be aligned during film sticking; a thickness of the single-sided silica gel hardened practical film 30 is 0.24 mm±0.05 mm. The single-sided silica gel hardened practical film 30 is applied to being pasted on a surface of the screen to protect the screen. The single-sided silica gel hardened practical film 30 adopting such a thickness has a plurality of advantages including a relatively hard texture, a relatively good scratch-resistance and a high transparency; a thickness of the top layer protective film 40 is 0.06 mm±0.01 mm, the top layer protective film 40 adopting such a thickness owns a high protective character for a whole structure of the protective film, avoiding dusts from entering the whole structure of the protective film. It is for sure that the single-sided silica gel hardened practical film 30 may also adopt a common PVC transparent film, or a plurality of other soft materials; and the bottom layer release film 10, the single-sided silica gel segmented composite release film 20, and the top layer protective film 40 may adopt other soft materials or transparent materials.

Figure 2:
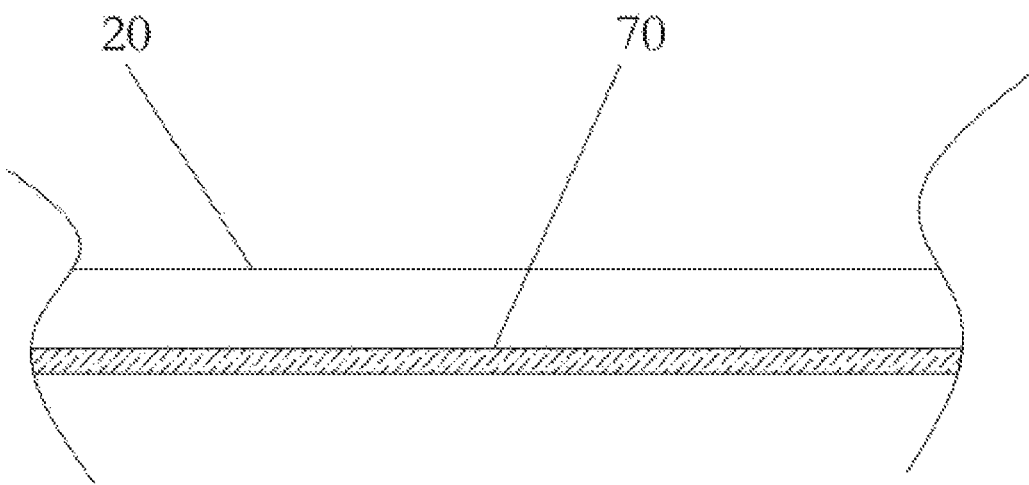
FIG. 2 illustrates a structural schematic diagram on a single-sided silica gel segmented composite release film and a low-viscosity silica gel layer in the four-layer structure screen protective film provided by the present disclosure.
Figure 3:
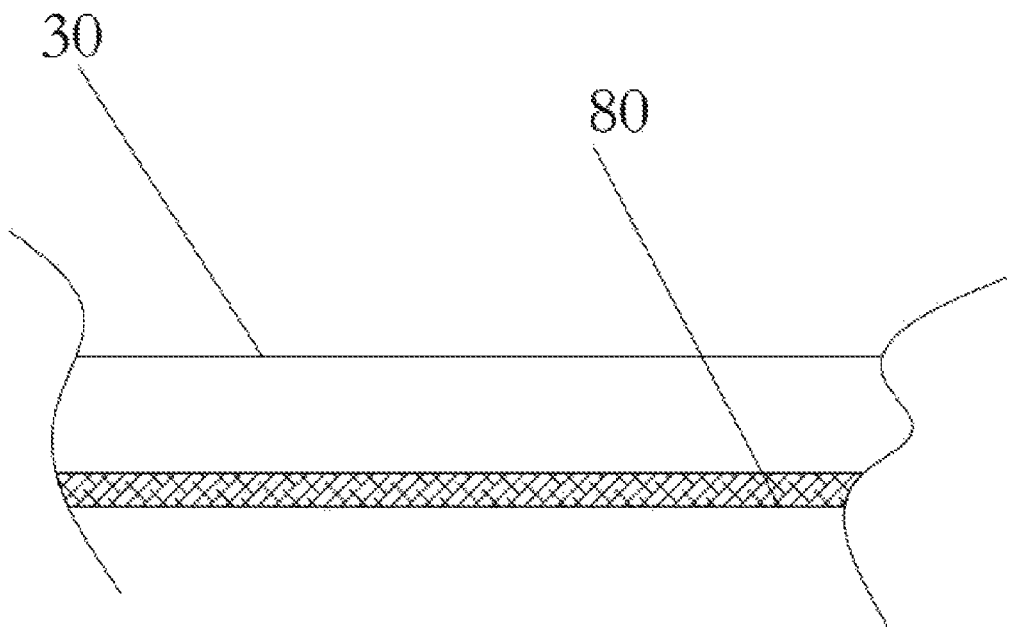
FIG. 3 illustrates a structural schematic diagram on a single-sided silica gel hardened practical film and a silica gel layer in the four-layer structure screen protective film provided by the present disclosure.

Shown as FIG. 1 and FIG. 2, a lower surface of the single-sided silica gel segmented composite release film 20 has a low-viscosity silica gel layer 70 fixedly arranged, while a lower surface of the low-viscosity silica gel layer 70 is bonded to an upper surface of the bottom layer release film 10, during a film sticking process, the single-sided silica gel segmented composite release film 20 and the low-viscosity silica gel layer 70 are applied in a whole. Shown as FIG. 1 and FIG. 3, a lower surface of the single-sided silica gel hardened practical film 30 has a silica gel layer 80 fixedly arranged, the silica gel layer 80 is a transparent layer, and a lower surface of the silica gel layer 80 is bonded to the single-sided silica gel segmented composite release film 20, during the film sticking process, the single-sided silica gel hardened practical film 30 and the silica gel layer 80 are applied in a whole. Between the single-sided silica gel hardened practical film 30 and the top layer protective film 40, there is a sticking layer arranged (not shown in the FIGs), the sticking layer is applied to bonding an upper surface of the single-sided silica gel hardened practical film 30 to a lower surface of the top layer protective film 40. During the film sticking process, the sticking layer and the top layer protective film 40 are applied in a whole, the sticking layer makes the top layer protective film 40 fix on the upper surface of the single-sided silica gel hardened practical film 30, the sticking layer generally adopts an easy-to-remove viscous material, so as to facilitate to uncover the top layer protective film 40 above the single-sided silica gel hardened practical film 30, after the silica gel layer 80 under the single-sided silica gel hardened practical film 30 has stuck to the screen.

Shown as FIG. 1, the single-sided silica gel segmented composite release film 20 has a plurality of break lines 23 arranged along a length direction, the plurality of break lines 23 segment the single-sided silica gel segmented composite release film 20 into a plurality of pieces. In the present embodiment, the break line 23 is arranged as one, one of the break line 23 has segmented the single-sided silica gel segmented composite release film 20 into a first segmented composite release film 21 and a second segmented composite release film 22.

First, a device that needs to be film stuck is placed, then the screen of the device is wiped, and checked for dusts and any particles after having been wiped clean. Uncovering the bottom release film 10, before the low-viscosity silica gel at the bottom of the single-sided silica gel segmented composite release film 20 is applied to an alignment on the screen. Due to adopting the low-viscosity silica gel, thus it is possible to align repeatedly on the screen. Then the first segmented composite release film 21 on one side of the break line 23 is peeled off, due to the break line 23 segments the single-sided silica gel segmented composite release film 20, thus after peeling off the first segmented composite release film 21, the silica gel layer 80 on the bottom of the single-sided silica gel hardened practical film 30 will automatically be stuck on the surface of the screen after being released down, turning over the device and lifting the second segmented composite release film 22, before peeling off the second segmented composite release film 22, and releasing the four-layer structure screen protective film down again, a whole surface of the single-sided silica gel hardened practical film 30 will be stuck on the screen by the silica gel layer 80. The single-sided silica gel hardened practical film 30, acted as a usage layer for the four-layer structure screen protective film, is stuck on the screen for a protection purpose, followed by peeling off the top layer protective film 40 and finishing sticking the film. Similarly, for a plurality of break lines 23, a plurality of segmented composite release films may be removed in a sequence, so as to complete the film sticking.

Thus, in the present embodiment, by adopting the single-sided silica gel segmented composite release film 20, it is possible to make the single-sided silica gel hardened practical film 30 bond to the screen segmentally, and during a process of correcting positions repeatedly, it is only required to expose a segmentally stuck part of the silica gel layer 80. Thus a large area of silica gel exposing is avoided, so as not to absorb any dusts or cilia in the air; before the single-sided silica gel hardened practical film 30 is bonded to the screen, it is possible to correct a position repeatedly, making a film sticking process more accurate, the silica gel layer 80 facilitates open and close repeatedly, and during a process of correcting the position repeatedly, when reopen the single-sided silica gel segmented composite release film 20, the screen is cleaned a second time by silica gel layer 80 thereon.

A front end of the bottom layer release film 10 has a first hand-tearing label 51 arranged, an end of the first segmented composite release film 21 near the break line 23 has a second hand-tearing label 52 arranged, an end of the second segmented composite release film 22 near the break line 23 has a third hand-tearing label 53 arranged, and a rear end of the top layer protective film 40 has a fourth hand-tearing label 54 arranged. A plurality of hand-tearing labels in the present embodiment is integrally molded with the film structures correspondingly, making the bottom layer release film 10 be peeled off by the first hand-tearing label 51, the first segmented composite release film 21 be peeled off by the second hand-tearing label 52, the second segmented composite release film 22 be peeled off by the third hand-tearing label 53, the top layer protective film 40 be peeled off by the fourth hand-tearing label 54, which are all convenient to be peeled off during film sticking, owns a strong convenience. The first hand-tearing label 51, the second hand-tearing label 52, the third hand-tearing label 53 and the fourth hand-tearing label 54 are on a same side of the four-layer structure screen protective film. A plurality of hand-tearing labels are arranged on a same side, makes peeling off the films to a same direction, during a film peeling process, which facilitates the film sticking process, makes a whole protective film structure coordinate, as well as facilitating a manufacture and process of the four-layer structure screen protective film. However, a position of the hand-tearing label is not limited by the positions in the present embodiment, it is also possible to adjust the positions of the hand-tearing labels according to different models.

A middle area on each end of the bottom layer release film 10, the single-sided silica gel segmented composite release film 20, the single-sided silica gel hardened practical film 30 and the top layer protective film 40 has a button hole arranged, that avoids a disturbance to a button in the device. A position of the button hole 60 may be arranged according to different models, or may not arrange any button holes. Also, it is possible to arrange a plurality of holes according to a plurality of different requirements, including a sound hole, a sensor hole, a camera hole and more, which is not limited to what in the present embodiment.

Figure 7:
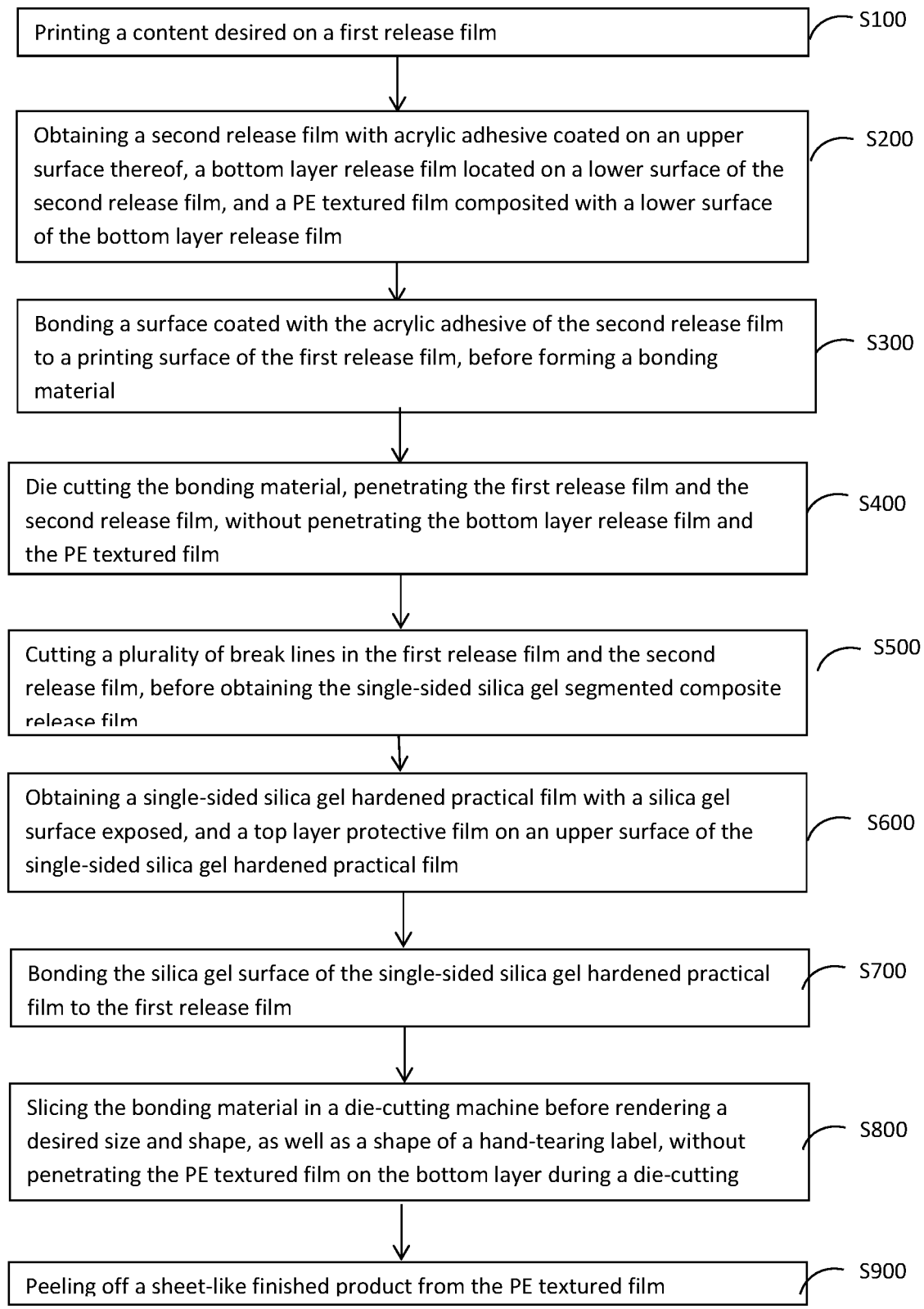
FIG. 7 illustrates a process diagram on an embodiment of a manufacturing process for a four-layer structure screen protective film provided by the present disclosure.

Shown as FIG. 7, the present solution has further provided a manufacturing process for the four-layer structure screen protective film, comprising a plurality of following steps:

Step S100. Printing a content desired on a first release film.

Specifically, preparing a plurality of logo patterns or text contents on the four-layer structure screen protective film according to a requirement, and printing a plurality of contents and patterns desired on the first release film by a printer.

Figure 8:
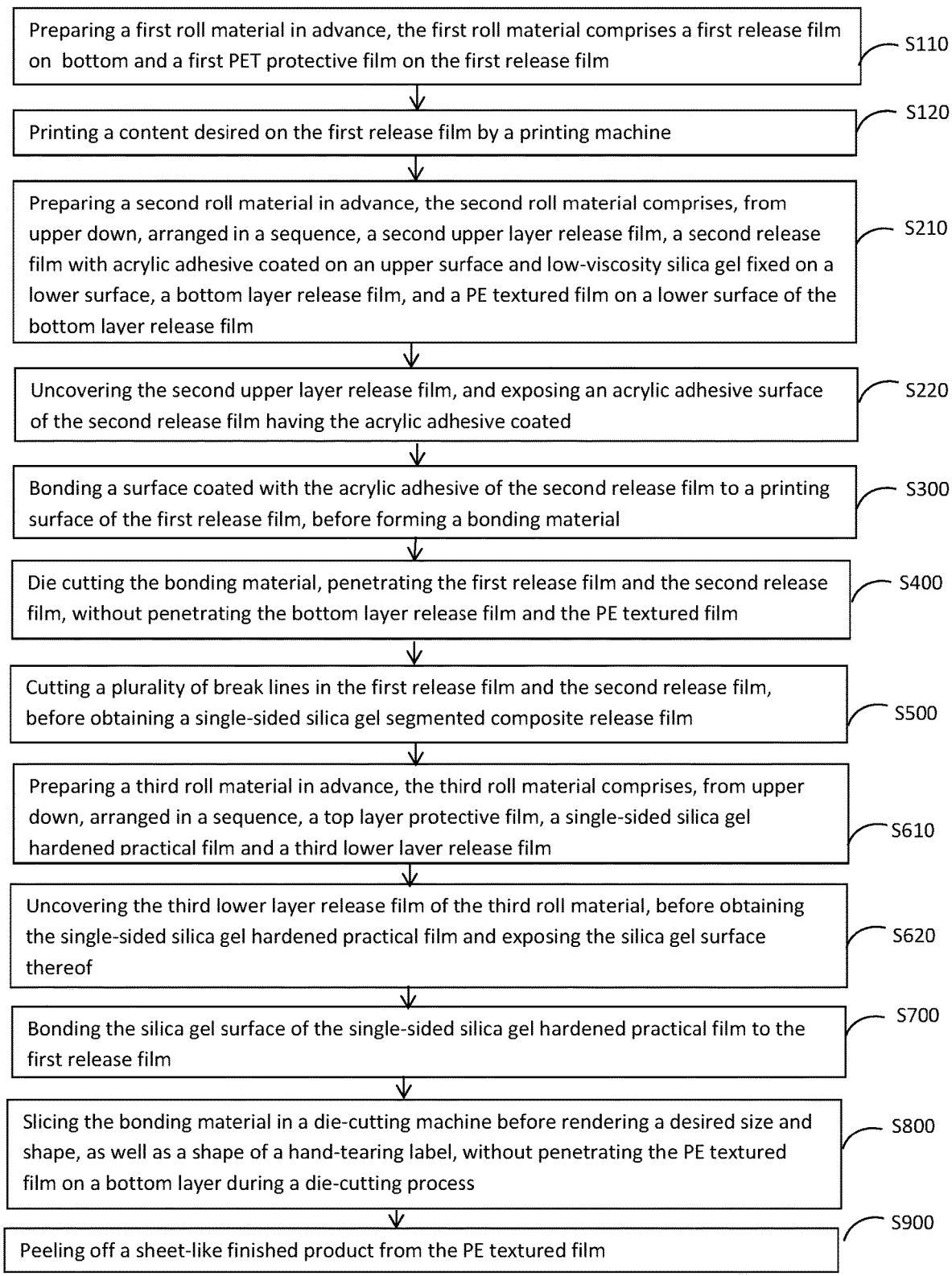
FIG. 8 illustrates a process diagram on a preferred embodiment of a manufacturing process for a four-layer structure screen protective film provided by the present disclosure.

Shown as FIG. 8, in a preferred embodiment, the step S100 comprises specifically:

Step S110. Preparing a first roll material, the first roll material comprises a first release film on a bottom and a first PET protective film sticking on the first release film.

Step S120. Printing the contents desired onto the first release film by the printer.

Figure 4:
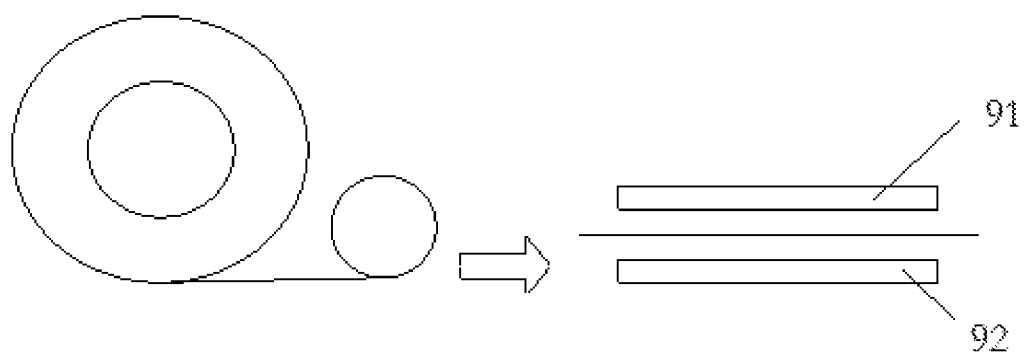
FIG. 4 illustrates a structural schematic diagram on a first roll material.

Specifically: material preparing: preparing a first roll material in advance, shown as FIG. 4, the first roll material comprises a first PET protective film 91 with a thickness of 60 μm, and a first release film 92 with a thickness of 75 μm. The first PET protective film 91 is a single layer film structure, while a bottom of the first PET protective film 91 bonds with the first release film 92; the first roll material may be directly unwound for a batch production. The contents and patterns desired are printed onto the first release film 92 on a back of the first roll material by a printer.

Step S200. Obtaining a second release film 94 with acrylic adhesive coated on an upper surface thereof, a bottom layer release film 10 located on a lower surface of the second release film 94, and a PE textured film 96 composited with a lower surface of the bottom layer release film 10.

Shown as FIG. 8, in a preferred embodiment, the step S200 comprises specifically:

Step S210. Preparing a second roll material in advance, the second roll material comprises, from upper down, arranged in a sequence, a second upper layer release film 93, a second release film 94 with acrylic adhesive coated on an upper surface and low-viscosity silica gel fixed on a lower surface, a bottom layer release film 10, and a PE textured film 96 on a lower surface of the bottom layer release film.

Step S220. Uncovering the second upper layer release film 93, and exposing an acrylic adhesive layer of the second release film 94 with acrylic adhesive coated.

Figure 5:
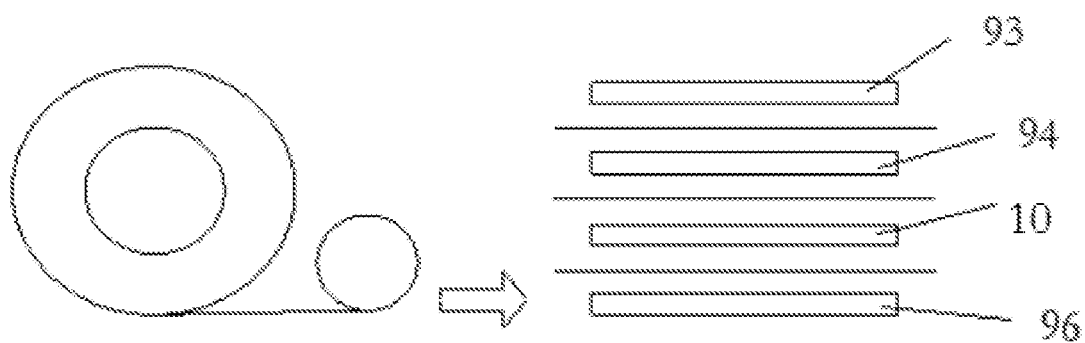
FIG. 5 illustrates a structural schematic diagram on a second roll material.

Specifically: shown as FIG. 5, the second roll material comprises a second upper layer release film 93 with a thickness of 50 μm, a second release film 94 with a thickness of 70 μm having acrylic adhesive coated on one side and a low-viscosity silica gel fixed on another side, and a bottom layer release film 10, a PE textured film 96. Both the second upper layer release film 93 and the second release film 94 are adopting a PET material; the second upper layer release film 93 is a top layer, the second release film 94 having acrylic adhesive coated on one side and a low-viscosity silica gel fixed on another side is a second layer, the bottom layer release film 10 is a third layer, the bottom layer release film 10 is a PET release film with a thickness of 50 μm, the PE textured film 96 locates on a fourth layer with a thickness of 60 μm. Four layers thereof are bonding before forming a roll material. The second roll material may be directly unwound for a batch production. Peeling off the second upper layer release film 93 on a top of the second roll material, and exposing the acrylic adhesive layer of the second release film 94 thereafter.

Step S300. Bonding a surface of the second release film 94 coated with the acrylic adhesive to a printing surface of the first release film 92, before forming a bonding material.

Step S400. Die cutting the bonding material, penetrating the first release film 92 and the second release film 94, without penetrating the bottom layer release film 10 and the PE textured film 96.

Step S500. Cutting a plurality of break lines in the first release film 92 and the second release film 94, before obtaining the single-sided silica gel segmented composite release film 20.

Specifically: Bonding an exposed surface of the second release film 94 coated to the acrylic adhesive with a printing surface of the first release film 92 of the first roll material, before executing a winding. Followed by loading the bonding material after winding into an automatic die cutting machine, now a structure of the bonding material is, from upper down, the first PET protective film 91, the first release film 92, the second release film 94 bonding tightly with the first release film 92, the bottom layer release film 10, and the PE textured film 96. Wherein the first release film 92 and the second release film 94 are bonding tightly together to form the single-sided silica gel segmented composite release film 20; followed by an automatic positioning die cutting to the bonding material, before penetrating the first PET protective film 91, the first release film 92, and the second release film 94, without penetrating the bottom layer release film 10 and the PE textured film 96. A first die cuter cuts a plurality of break lines, making the single-sided silica gel segmented composite release film 20 achieve segmenting.

It is then needed to obtain the single-sided silica gel segmented composite release film 20. specifically: the bonding material enters a dual-seat binding machine in between two of the die cutting machines, a first station in the dual-seat binding machine peels off automatically the first PET protective film 91 on an upmost surface of the material, wherein, the bonding material is a single-sided silica gel segmented composite release film 20, a bottom layer release film, a PE textured film 96.

S600. Obtaining a single-sided silica gel hardened practical film 30 with a silica gel surface exposed, and a top layer protective film 40 on an upper surface of the single-sided silica gel hardened practical film 30.

Specifically, preparing a material: preparing the single-sided silica gel hardened practical film 30 and the top layer protective film 40 on an upper surface of the single-sided silica gel hardened practical film 30, while a silica gel surface of the single-sided silica gel hardened practical film exposing.

Shown as FIG. 8, in a preferred embodiment, the step S600 comprises specifically:

Step S610. Preparing a third roll material in advance, the third roll material comprises, from upper down, arranged in a sequence, the top layer protective film 40, the single-sided silica gel hardened practical film 30 and a third lower layer release film 97.

Step S620. Uncovering the third lower layer release film 97 of the third roll material, before obtaining the single-sided silica gel hardened practical film 30 and exposing the silica gel surface.

Figure 6:
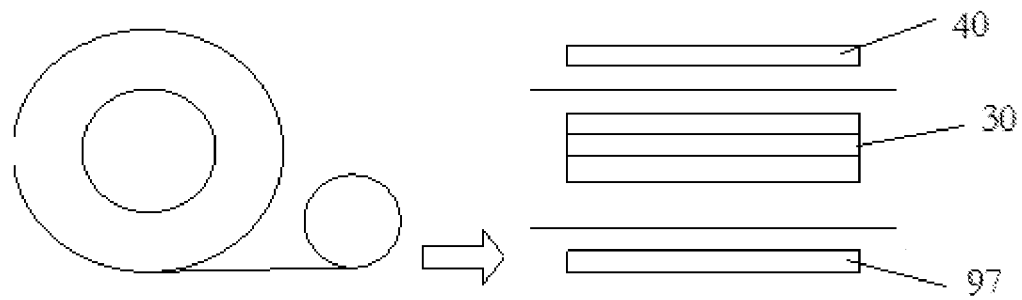
FIG. 6 illustrates a structural schematic diagram on a third roll material.

Specifically, shown as FIG. 6, the third roll material comprises the top layer protective film 40 with an acrylic adhesive layer, having a thickness of 60 µm, a single-sided silica gel hardened practical film 30 stuck on a lower surface of the acrylic adhesive layer and with the silica gel surface exposed, and the third lower release film 97 with a thickness of 50 µm and located on a lower surface of the silica gel surface; the single-sided silica gel hardened practical film 30 bonds to the top layer protective film 40 through the acrylic adhesive layer. A second station in the dual-seat binding machine uncovers the third lower release film 97 on a bottom of the third roll material, before obtaining the single-sided silica gel hardened practical film 30 with the silica gel surface exposed.

Step S700. Bonding the silica gel surface of the single-sided silica gel hardened practical film 30 to the first release film 92.

Specifically, after obtaining the single-sided silica gel hardened practical film 30 with the silica gel surface exposed, bonding the silica gel surface to the first release film 92, that is, bonding to the single-sided silica gel segmented composite release film 20. Through uncovering one side while bonding another side during a manufacturing process, a synchronous manufacturing is achieved. Now a material structure manufactured is: the top layer protective film 40, the single-sided silica gel hardened practical film 30 with the silica gel surface, the single-sided silica gel segmented composite release film 20 formed by bonding the first release film 92 to the second release film 94, the bottom layer release film 10, and the PE textured film 96.

Step S800. Slicing the bonding material in a die-cutting machine before rendering a desired size and shape, as well as a shape of a hand-tearing label, without penetrating the PE textured film 96 on the bottom layer during a die-cutting process.

Specifically, the material is put into a die-cutting machine after a bonding process, and sliced in the die-cutting machine, before forming a desired size and shape, as well as a shape of the hand-tearing label.

In a process described above, by changing the first PET protective film 91, the single-sided silica gel hardened practical film 30 is bonded to the single-sided silica gel segmented composite release film 20 being cut, followed by die cutting the shape of the product and the hand-tearing label. It has effectively avoided an opening of the single-sided silica gel segmented composite release film 20 being cut from hurting a base material of the single-sided silica gel hardened practical film 30.

Step S900. Peeling off a sheet-like finished product from the PE textured film 96.

Specifically, peeling off the sheet-like finished product from the PE textured film 96 in a last step, and the finished product is divided into four layers, each layer has a hand-tearing label, wherein, the bottom layer release film 10 is arranged on the lowest layer, the single-sided silica gel segmented composite release film 20 is arranged on the upper surface of the bottom layer release film 10, the single-sided silica gel hardened practical film 30 is arranged on an upper surface of the single-sided silica gel segmented composite release film 20, and the top layer protective film 40 is arranged on an upper surface of the single-sided silica gel hardened practical film 30.

All above, the present solution provides a four-layer structure screen protective film and a manufacturing process thereof, by adopting a single-sided silica gel segmented composite release film 20, being able to bond the single-sided silica gel hardened practical film 30 segmentally to the screen, after a process of adjusting a whole face of the low-viscosity silica gel to align on a screen repeatedly, it is only needed to expose part of the silica gel of the single-sided silica gel hardened practical film 30 on a bonding segment, so as to avoid a large area of the silica gel in the silica gel layer 80 from exposing, and avoid from sucking the dust and cilia in the air; being able to adjust a position repeatedly before the single-sided silica gel hardened practical film 30 being stuck on the screen, making a film sticking process more accurate, the low-viscosity silica gel is able to be opened and closed repeatedly, and during the process of adjusting the position repeatedly, a second time cleaning is made to the screen by the low-viscosity silica gel layer thereon, when reopen the single-sided silica gel segmented composite release film 20. By adopting the plurality of hand-tearing labels, it is convenient to tear during the film sticking, having a strong convenience; by changing the first PET protective film 91 during a manufacturing process, the single-sided silica gel hardened practical film 30 is bonded to the single-sided silica gel segmented composite release film 20 having been cut open, followed by die cutting the shape of the product and the plurality of hand-tearing labels, it has effectively avoided an opening of the single-sided silica gel segmented composite release film 20 being cut from hurting a base material of the single-sided silica gel hardened practical film 30.

It should be understood that the application of the present invention is not limited to the above examples and can be improved or transformed by those skilled in the art based on the above description. All these improvements and transformations should fall within the protection scope of the appended claims of the present invention.

What is claimed is:

1. A four-layer structure screen protective film, wherein comprising a plurality of films arranged in a sequence, from bottom up: a bottom layer release film, a silica gel segmented composite release film, a silica gel hardened film, and a top layer protective film;

the silica gel segmented composite release film has a plurality of break lines arranged along a length direction, the plurality of break lines segment the silica gel segmented composite release film into a plurality of pieces;

a lower surface of the silica gel segmented composite release film has a first silica gel layer fixedly arranged, while a lower surface of the first silica gel layer is bonded to an upper surface of the bottom layer release film;

a lower surface of the silica gel hardened film has a second silica gel layer fixedly arranged, while a lower surface of the second silica gel layer is bonded to the silica gel segmented composite release film.

2. The four-layer structure screen protective film according to claim 1, wherein one of the plurality of break lines segments the silica gel segmented composite release film into a first segmented composite release film and a second segmented composite release film.

3. The four-layer structure screen protective film according to claim 2, wherein, a middle area on a same side of the bottom layer release film, the silica gel segmented composite release film, the silica gel hardened film and the top layer protective film has a button hole arranged.

4. The four-layer structure screen protective film according to claim 2, wherein, one side of the bottom layer release film has a first hand-tearing label arranged, one side of the first segmented composite release film near the break line has a second hand-tearing label arranged, one side of the second segmented composite release film near the break line has a third hand-tearing label arranged, and one side of the top layer protective film has a fourth hand-tearing label arranged.

5. The four-layer structure screen protective film according to claim 4, wherein, a middle area on a same side of the bottom layer release film, the silica gel segmented composite release film, the silica gel hardened film and the top layer protective film has a button hole arranged.

6. The four-layer structure screen protective film according to claim 4, wherein, the first hand-tearing label, the second hand-tearing label, the third hand-tearing label and the fourth hand-tearing label are on a same side of the four-layer structure screen protective film.

7. The four-layer structure screen protective film according to claim 6, wherein, a middle area on a same side of the bottom layer release film, the silica gel segmented composite release film, the silica gel hardened film and the top layer protective film has a button hole arranged.

8. The four-layer structure screen protective film according to claim 1, wherein, a middle area on a same side of the bottom layer release film, the silica gel segmented composite release film, the silica gel hardened film and the top layer protective film has a button hole arranged.

9. The four-layer structure screen protective film according to claim 1, wherein, between the silica gel hardened film and the top layer protective film, there is an adhesive layer arranged, the adhesive layer is applied to bond an upper surface of the silica gel hardened film with a lower surface of the top layer protective film.

\* \* \* \* \*